United States Patent
Ghyvoronsky

(10) Patent No.: US 9,597,992 B2
(45) Date of Patent: Mar. 21, 2017

(54) VEHICLE BEVERAGE HOLDER

(71) Applicant: Maksim I Ghyvoronsky, Bothell, WA (US)

(72) Inventor: Maksim I Ghyvoronsky, Bothell, WA (US)

(*) Notice: Subject to any disclaimer, the term of this patent is extended or adjusted under 35 U.S.C. 154(b) by 0 days.

(21) Appl. No.: 14/888,890

(22) PCT Filed: May 5, 2014

(86) PCT No.: PCT/US2014/036852
§ 371 (c)(1),
(2) Date: Nov. 3, 2015

(87) PCT Pub. No.: WO2014/179812
PCT Pub. Date: Nov. 6, 2014

(65) Prior Publication Data
US 2016/0075266 A1    Mar. 17, 2016

Related U.S. Application Data

(60) Provisional application No. 61/819,271, filed on May 3, 2013.

(51) Int. Cl.
*B60N 3/10* (2006.01)
(52) U.S. Cl.
CPC .............. *B60N 3/105* (2013.01); *B60N 3/10* (2013.01); *B60N 3/101* (2013.01); *B60N 3/103* (2013.01)
(58) Field of Classification Search
CPC .......... B60N 3/10; B60N 3/101; B60N 3/103; B60N 3/105

USPC ......... 296/24.34, 37.8, 24.1; 248/312.1, 318, 248/312

See application file for complete search history.

(56) References Cited

U.S. PATENT DOCUMENTS

| | | | |
|---|---|---|---|
| 431,036 A | 7/1890 | Dawson | |
| 538,534 A | 4/1895 | O.Neill | |
| 2,601,767 A * | 7/1952 | Wall | A47G 19/2261 220/603 |
| 2,950,836 A | 8/1960 | Murdock | |
| 3,185,341 A * | 5/1965 | Barbour | B65D 25/48 220/260 |

(Continued)

*Primary Examiner* — Dennis H Pedder
(74) *Attorney, Agent, or Firm* — Dean A. Craine

(57) ABSTRACT

A vehicle center console holder for a vehicle that temporarily holds and continuously adjusts the orientation of a beverage container filled with a consumable liquid that prevents spills and allows easy removal and placement into the holder as the vehicle is moving. The holder includes a base with an upper hole with a smooth perimeter edge and a suspended beverage container vessel that fits into the upper hole and rests against the perimeter edge. The container vessel includes a downward extending, half-spherical upper member and a lower neck. Formed inside the container vessel is a center bore that receives a complimentary shaped beverage container. The upper member and the perimeter edge on the base are configured to form a gripping space between the beverage container and the upper member. When the vessel's lower neck is placed inside the upper hole, the base's perimeter edge simultaneously supports the upper member and allows the vessel to swivel freely when a beverage container is placed in the vessel.

17 Claims, 14 Drawing Sheets

(56) References Cited

U.S. PATENT DOCUMENTS

| | | | |
|---|---|---|---|
| 3,341,062 A * | 9/1967 | Phillips | A47G 19/2272 220/711 |
| 4,726,487 A | 2/1988 | Mitri | |
| 5,094,415 A | 3/1992 | Revette et al. | |
| 5,174,534 A | 12/1992 | Mitchell | |
| 5,238,211 A | 8/1993 | Borovski | |
| 5,769,369 A | 6/1998 | Meinel | |
| 5,857,601 A | 1/1999 | Greenwood | |
| 6,543,637 B1 | 4/2003 | Osborn | |
| 7,328,876 B2 * | 2/2008 | Jones | B60N 3/107 220/694.1 |
| 7,597,300 B2 | 10/2009 | Harada | |
| 7,748,678 B2 | 7/2010 | Camarota et al. | |
| 8,348,110 B1 | 1/2013 | Whynot et al. | |
| 2001/0017339 A1 | 8/2001 | Brotz et al. | |
| 2004/0129747 A1 | 7/2004 | Maierholzner | |
| 2005/0056759 A1 | 3/2005 | Tiller | |
| 2006/0278790 A1 | 12/2006 | Park | |
| 2007/0090256 A1 | 4/2007 | Hansen et al. | |
| 2008/0017764 A1 | 1/2008 | Nan | |
| 2013/0038097 A1 | 2/2013 | Oldani | |
| 2015/0367765 A1 | 12/2015 | Kupina | |

* cited by examiner

VEHICLE BEVERAGE HOLDER

TECHNICAL FIELD

This invention pertains to beverage holders for vehicles that hold and automatically adjusts the position of a beverage container while the vehicle is moving and allows the beverage container to be easily gripped and removed from the holder.

BACKGROUND ART

Today, drivers spend a large amount of time in their motor vehicles, and drivers and passengers usually drink beverages from cylindrical, tumbler containers. The beverage containers are usually placed in a fixed, cup-shaped holder located in a center console between the two front or rear seats. While most beverage containers have lids or caps, the liquids inside the beverage container sloshes from side-to-side inside the container as the motor vehicle is driven the beverage often drips from the top edge of the container or from the mouth opening formed in the lid.

The size of beverage holders in motor vehicles are standardized and intended to be used with cylindrical-shaped tumblers that measures approximately 7 to 9 inches in height, 2 to 3 inches in diameter and hold 12 to 16 fluid ounces. Many convenient stores sell beverages in containers, however that hold larger amounts of beverage (e.g. 32 fluid ounces) that do not fit into the motor vehicle's beverage holders. When larger containers are used, the drivers and passengers temporarily rest them on a flat surface on the center console, hold them between their legs, or hold them continuously in one hand. For drivers of motor vehicles with manual transmissions, trying to shift gears and hold a larger beverage container upright to prevent spillage is difficult.

Hot beverages are often sold with paper cups with plastic lids. The lid includes an outer circular gutter that snap fits over the cup's top edge. When placed in a motor vehicle beverage holder described above, often only the plastic lid attached to the top edge is exposed and therefore, becomes the only gripping surface for removing the container from the holder. Because the user must squeeze the sides of the lid to lift the cup from the holder, the lids often disengage from the cup causing burns.

DISCLOSURE OF THE INVENTION

Disclosed is a beverage holder designed for the center console area of a vehicle in between the front seats. The beverage holder is designed to temporarily hold a tumbler style beverage container filled with a consumable liquid that automatically and continuously adjusts the orientation of the beverage container to prevent spills as the vehicle is moving. The beverage holder is designed to accommodate different sizes of beverage containers, and allows the user to adjust the depth of the holder to position the beverage container at a suitable height when placed in the holder at a so it may be easily grasped. Sometimes, the beverage holder may be easily adjusted to hold a large container that holds up to 64 fluid oz.

The holder includes a hollow base with at least one upper hole with a thin, low contact, low friction perimeter edge. Inserted into the upper hole is a removable container vessel. The container vessel includes a half-spherical upper member that extends above the top surface of the base. The lower portion of the upper member rests against the hole's perimeter edge. The container vessel also includes a lower neck that extends through the upper hole and into the wide cavity formed inside the base.

The upper member is made of low friction plastic or nylon that allows the upper member to rotate freely in 360 degrees over the perimeter edge of the hole. The diameter and side walls of the upper member are larger than the diameter of the hole so the lower portion of the upper member extends slightly below the hole and the upper portion of the upper member extends above the hole. When the container vessel is longitudinally aligned over the upper hole, the transverse mid line axis of the upper member is aligned with the perimeter edge of the hole. The base is configured so the cavity is sufficiently large to allow the lower neck of the container vessel to swing freely side-to-side inside the base.

The lower neck of the container vessel is cylindrical with a closed lower end. The lower neck's side walls are straight and vertically or slightly aligned in a slightly downward converging angle. The length of the lower neck of the container vessel is substantially greater than the height of the upper portion. In the preferred embodiment, the length of the lower neck is sufficient so that at least 51% of the container is located below the mid-line axis of the upper member.

The lower neck of the container vessel includes a cylindrical center bore designed to receive a complimentary shaped beverage container. Because the upper portion of the upper member is larger in diameter than the center bore, when a straight walled beverage container is placed into the center bore, a gap is created between the inside surface of the exposed upper portion and the upper side walls of the beverage container that allows the user to easily grasp the beverage container.

When the lower neck of the container vessel is placed through the upper hole on the base and into the cavity, the upper member of the container vessel is supported by the perimeter edge of the upper hole. Because the perimeter edge and the upper member are thin, they have minimal contact surfaces and because they are both made of low friction material, the container vessel freely swivels and rotates 360 degrees around the upper hole's vertical center axis caused by centrifugal and centripetal forces applied to beverage container and the lower neck on the container vessel as the vehicle moves.

In one embodiment, a low friction replaceable ring is inserted in the upper hole. In another embodiment, a ball bear ring member is inserted onto the perimeter edge of the upper hole and supports the container vessel's upper member and allows it to swivel and rotate freely.

In one embodiment, the upper section of the lower neck includes an inner ring gripping member that fits around the side walls of a beverage container when placed into the container vessel. The gripping member includes flexible arms that apply a light inward resistant force to the sides of the beverage container that prevents the beverage container from moving inside the container vessel. In another embodiment, the flexible arms are integrally formed on the inside surface of the lower neck on the container vessel.

In another embodiment, at least three lower friction protrusions on the outer surface of the upper member that reduce the contact surface areas between the upper member and the perimeter edge of the hole.

In some instances, shorter beverage containers are used with the holder. To accommodate shorter beverage containers, one or more disc-shaped spacers may be placed over the closed end of the lower neck. In one embodiment, the spacers include a downward neck and a recessed upper surface that allows multiple spacers to be stacked together inside the cylindrical body.

During use, the width and height of a beverage container containing a consumable liquid is determined. If a standard 8 to 20 fl. Oz cylindrical beverage container is used, then the user then determiners the number of spacers needed to elevate the beverage container inside the container vessel so the upper edge of the beverage container is exposed above the container vessel and can be easily grasped to remove the beverage container from the holder. In some instances, the spacer may not be needed and removed.

If a larger beverage container is used, then one of the container vessels is removed from the base and stacked in the adjacent container vessel. The larger container may then be inserted into the upper hole of the base.

During use, the orientation of the beverage container inside the container vessel is continuously and automatically adjusted to prevent spills. Because the upper portion of the beverage container is exposed inside the upper member, the upper portion of the beverage container can be easily grasped and removed from the holder. When a beverage container is returned to the holder, the beverage container is lowered into the container vessel. Because the lower neck is longer than the upper portion, the larger percentage of mass of the beverage container is below the upper section's mid-line axis. This causes the container vessel to automatically rotate in the hole and maintain a vertical alignment as the vehicle is driven.

The holder is designed to be manufactured into the areas in between the seats of a vehicle. It may also be sold and distributed as original equipment or sold and distributed as an aftermarket accessory. The holder is installed in the area located in between front seats between the driver and a passenger or in the area in between rear passenger seats. The holder may also be incorporated into a fold down arm rest located in the rear seats of a vehicle. It should also be understood that the term vehicle is not limited to a standard motor vehicle but may include a truck, bus, air plane or boat or any other structure used to transport riders.

BEST MODE FOR CARRYING OUT THE INVENTION

Figure 1:
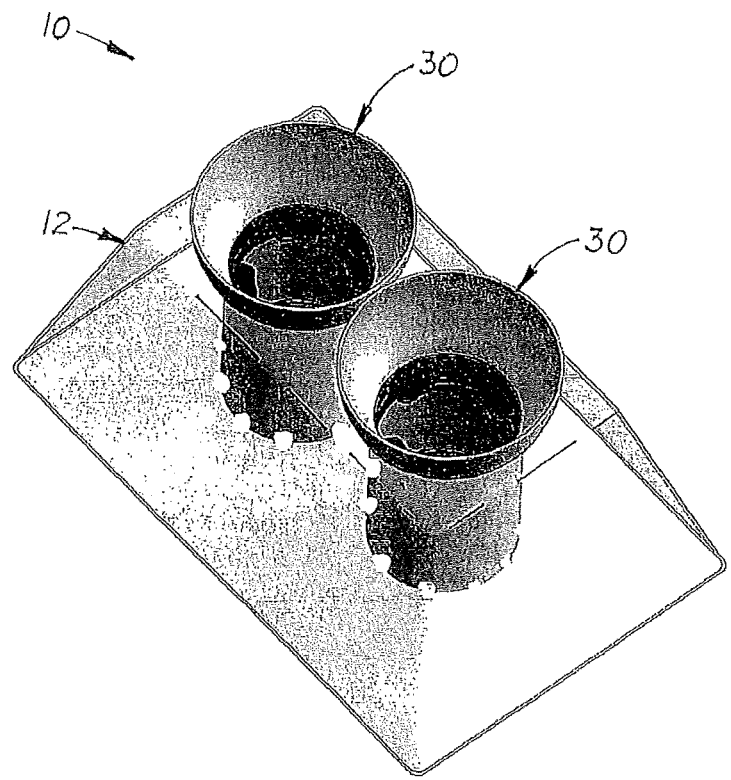
FIG. 1 is a perspective of view of a motor vehicle beverage holder.
Figure 2:
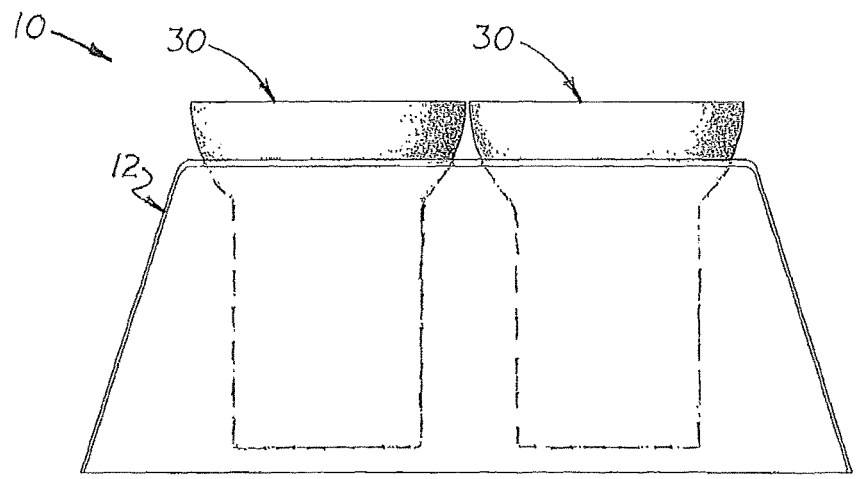
FIG. 2 is a side elevation view of the motor vehicle beverage holder.
Figure 3:
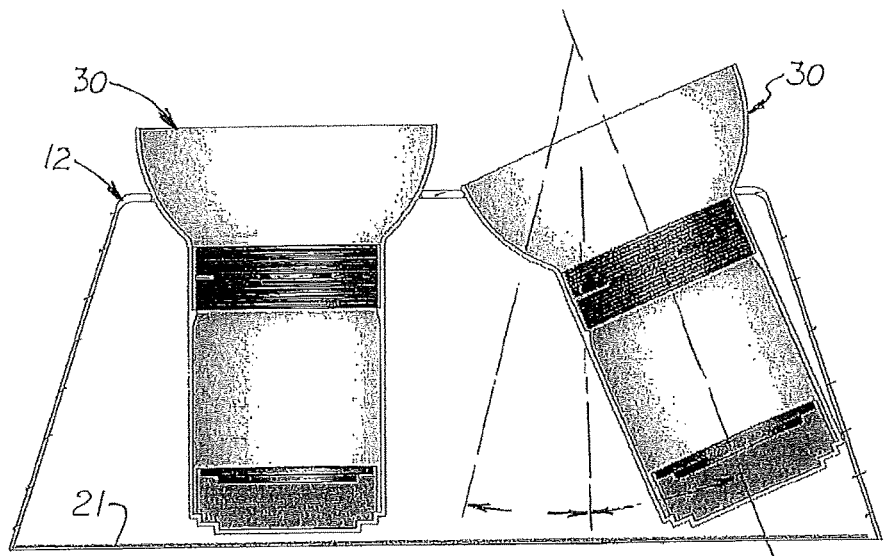
FIG. 3 is a sectional side elevation view of the motor vehicle beverage holder showing a beverage vessel in a rotated position inside a bore formed on the base.
Figure 4:
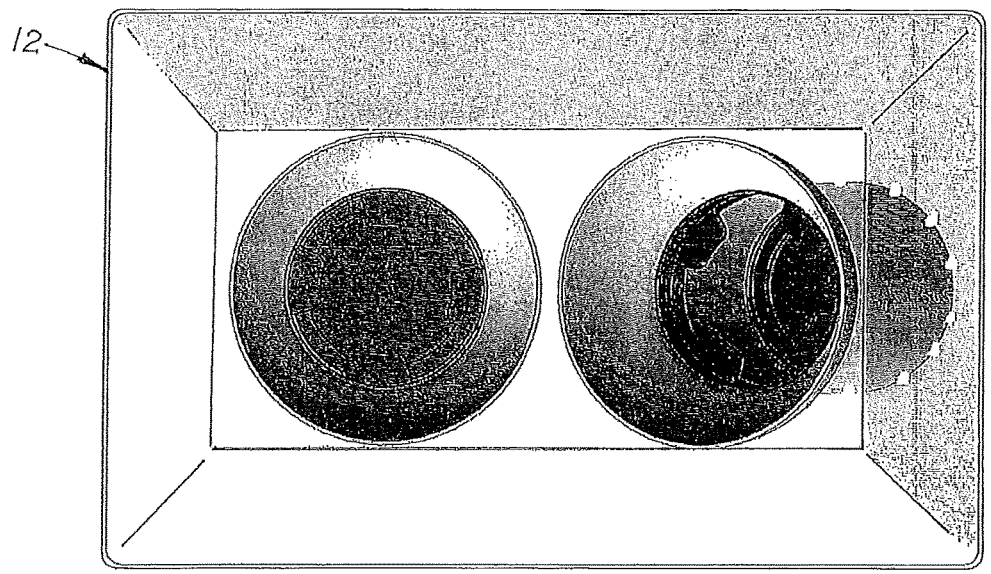
FIG. 4 is a top plan view of the motor vehicle beverage holder shown in FIG. 3.
Figure 5:
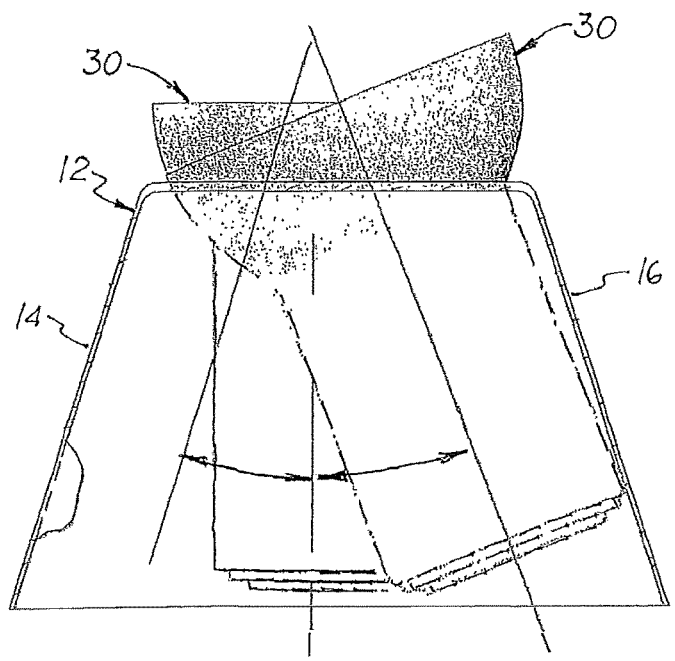
FIG. 5 is an end view of the motor vehicle beverage holder showing the container vessel rotated 45 degrees.
Figure 6:
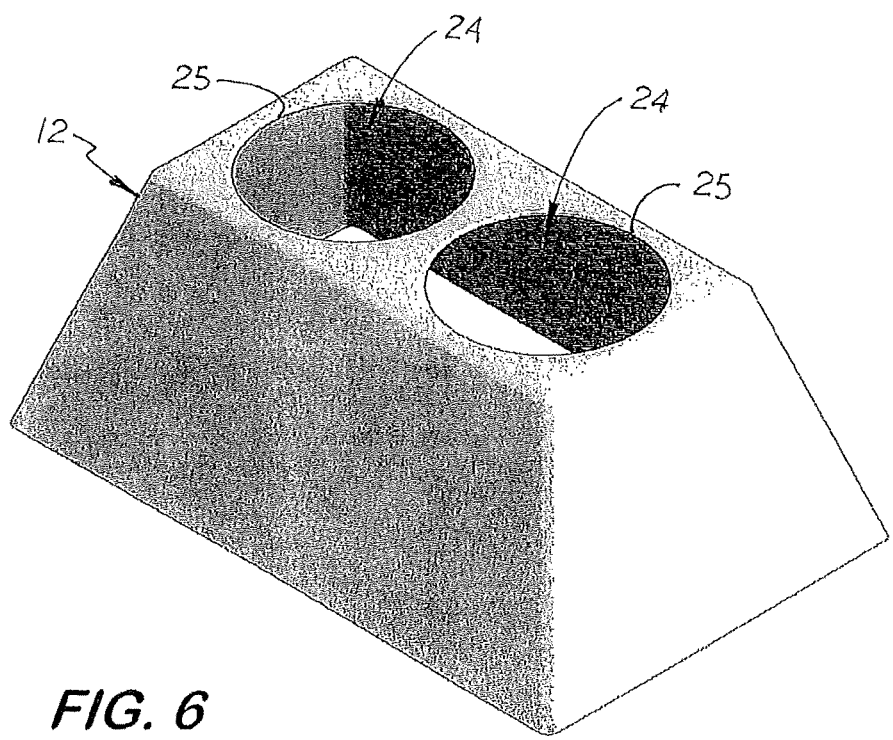
FIG. 6 is a perspective of view of the base with the container vessels removed.
Figure 7:
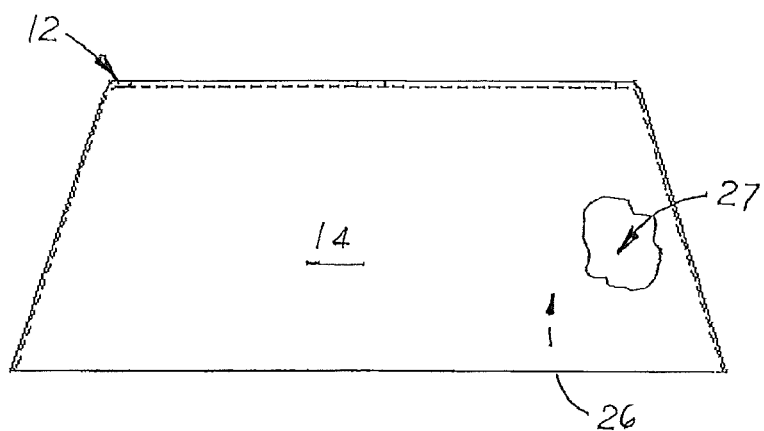
FIG. 7 is a side elevation view of the base.
Figure 8:
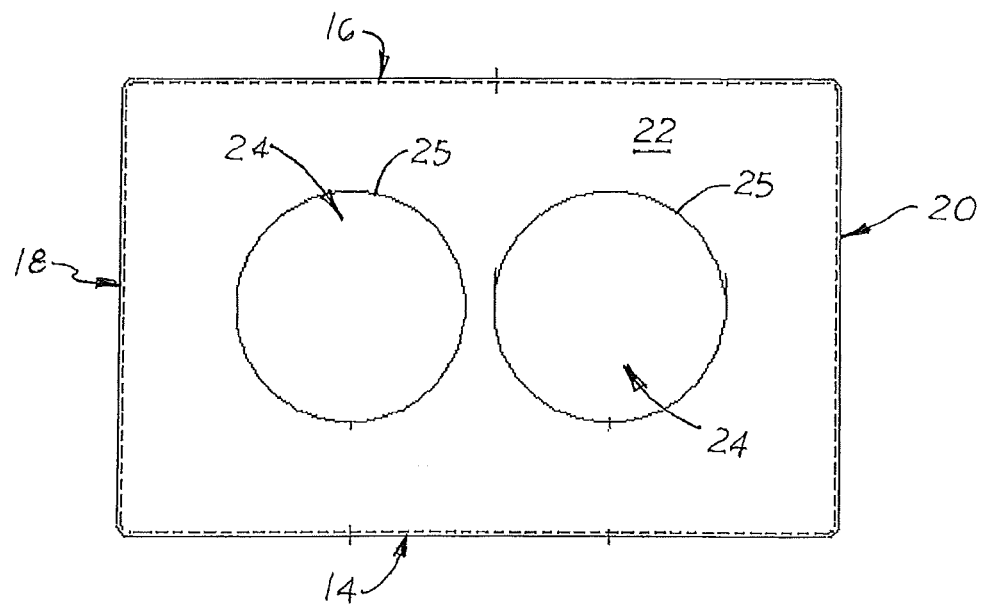
FIG. 8 is a top plan view of the base.

Disclosed is a console beverage holder 10 for a vehicle that temporarily holds a tumbler style beverage container 100 filled with a consumable liquid and automatically adjusts the orientation of the beverage container 100 as the vehicle is moving. The beverage holder 10 is also designed to accommodate a greater range of different sizes of beverage containers, and allows the user to adjust the height of the beverage container 100 when placed in the beverage holder 10 so it may be easily gripped.

The beverage holder 10 includes a base 12 with two side panels 14, 16, two end panels 18, 20, and a top panel 22. The base 12 may include an optional bottom panel 21. Formed on the top panel 22 is at least one upper hole 24 with a thin, smooth inside perimeter edge 25. A large lower cavity 27 is formed inside the base 12.

The beverage holder 10 also includes a beverage container vessel 30 that fits into each upper hole 24. The container vessel 30 is a cup like structure with a half-spherical upper member 36 and a lower neck 44 that extends below the upper hole 24 and into the lower cavity 27 formed inside the base 12. The upper member 36 is made of low friction plastic that allows it to rotate freely over the perimeter edge 25. The diameter and side walls of the upper member 36 are larger than the diameter of the upper hole 24 so the wide upper portion of the upper member 36 is positioned above the upper hole 24 and the entire lower neck 44 is positioned below the upper hole 24.

Figure 10:
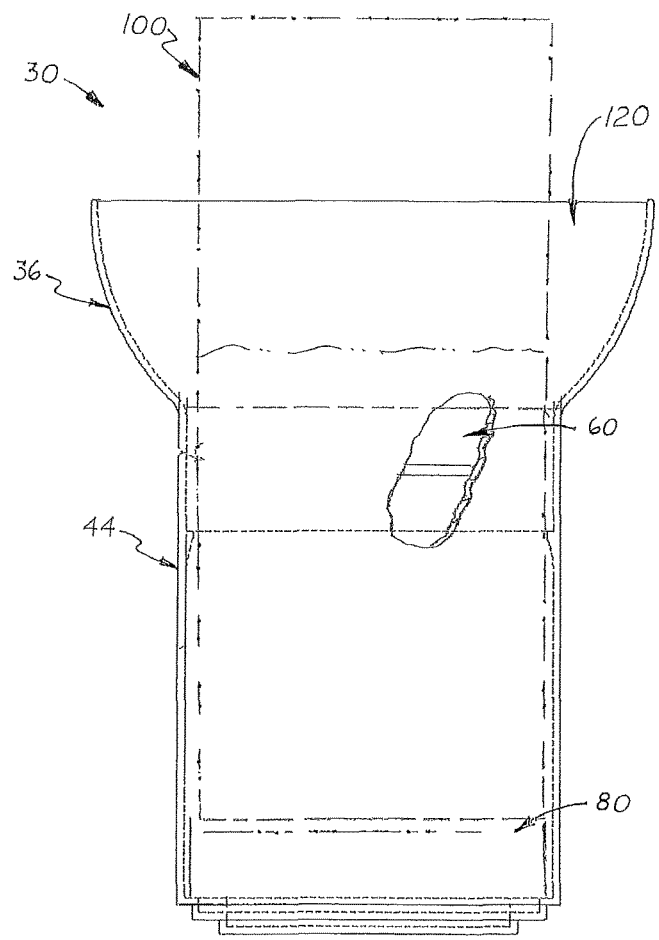
FIG. 10 is a side elevation view of one container vessel.

The lower neck 44 is integrally formed with the upper member 36 and configured to receive a large beverage container 100. As stated above, the lower neck 44 serves as a keel or ballast so the upper member 36 is forced downward and remains in contact with the upper hole 24. The length of the lower neck 44 and the diameter and curvature of the upper member 36 are configured so that when a beverage container 100 is placed into the lower neck 44, a gap 120 is created between the inside surface of the upper member 36 and the outer side walls of the beverage container 100 (see FIG. 10) that allows the side walls of the beverage container 100 to be easily gripped with a pair of fingers and pulled upward.

Figure 11:
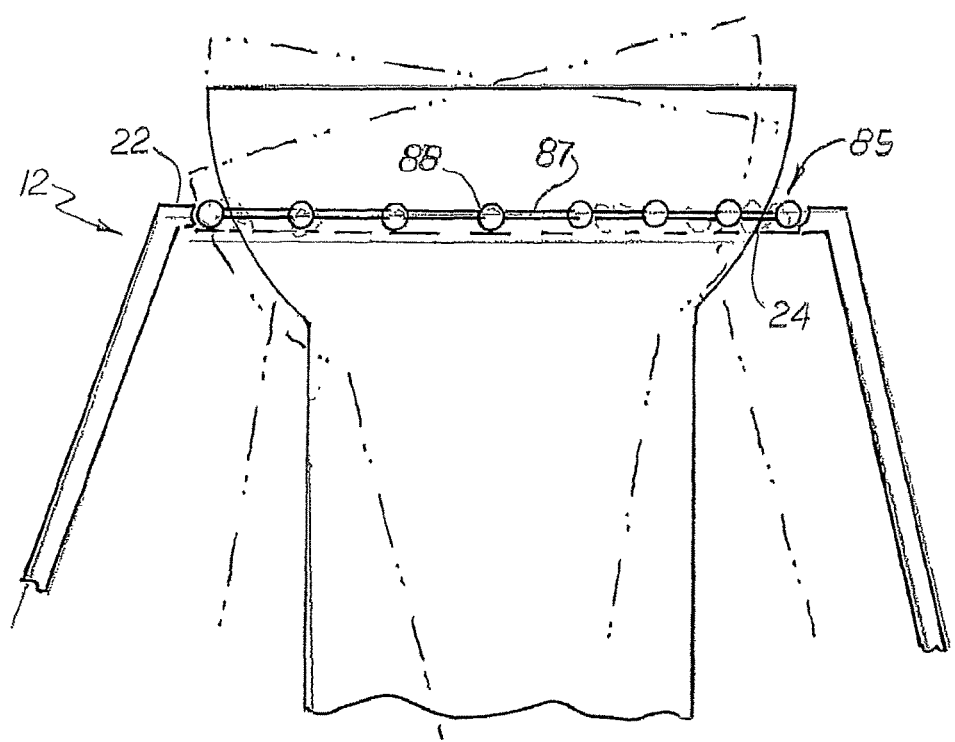
FIG. 11 is a side elevational view of a second embodiment of the invention showing a container vessel placed into the upper hole formed on the base with a ball bearing ring positioned along the perimeter edge of the upper hole that supports the beverage vessel.
Figure 12:
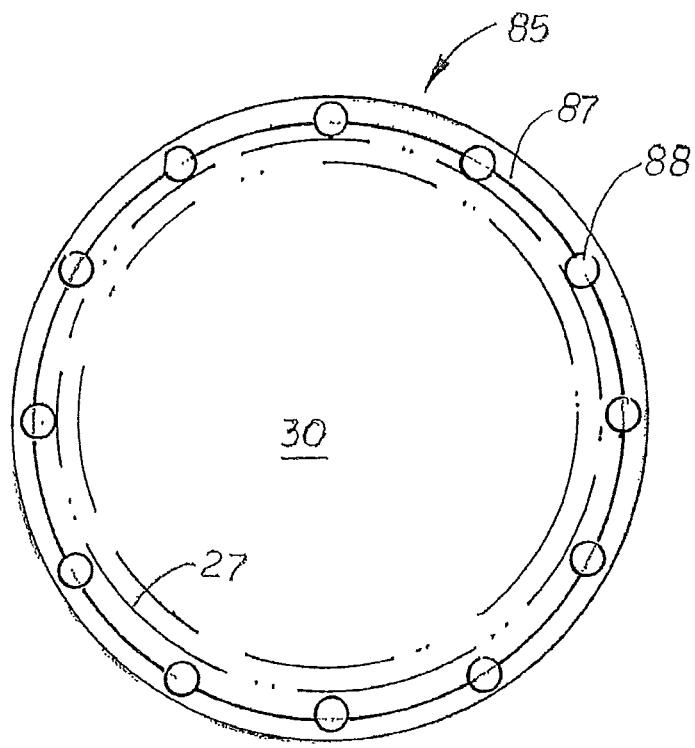
FIG. 12 is a top plan view of the base showing the ball bearing ring located on the perimeter edge of the upper hole.

In another embodiment, shown in FIGS. 11 and 12, a ball bear ring 85 is inserted into the perimeter edge 25 of the hole 24 and supports the container vessel's upper member and allows it to swivel and rotate freely. The ball bearing ring 85 includes a ring-shaped race 87 with a plurality of small ball bearings 88 evenly distributed and mounted thereon. The race 87 is mounted on a circular flange surface formed on the base 12 and around the upper hole 24. The ball bearings 88 protrude slightly upward and inward from the race 87 thereby holding the container vessel 30 over the upper hole 24.

Figure 13:
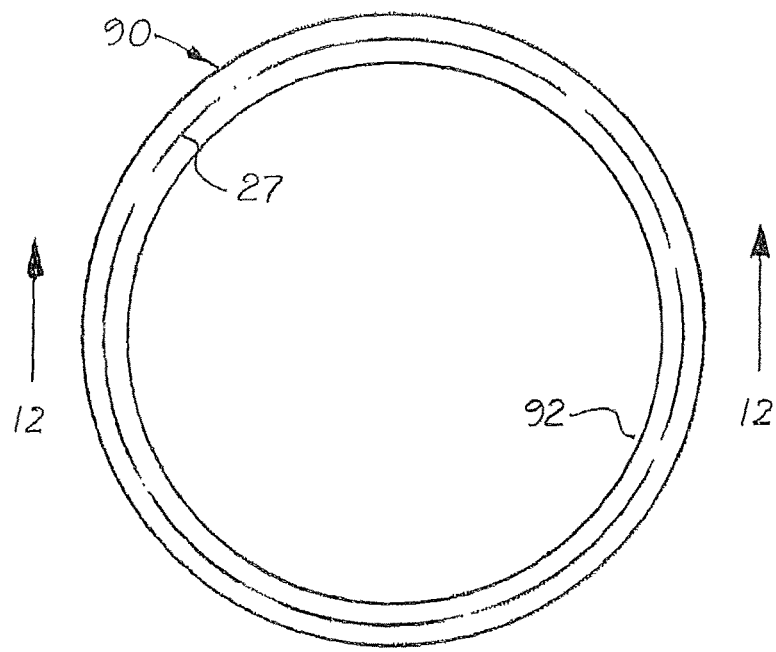
FIG. 13 is a top plan view of the optional replaceable low friction ring.
Figure 14:
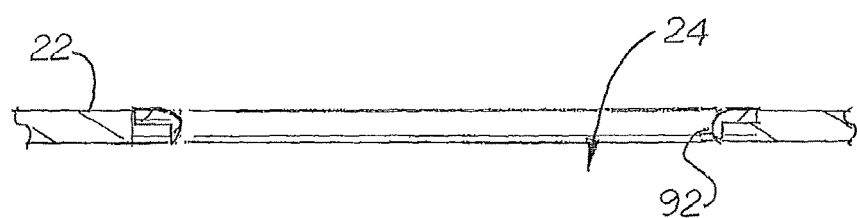
FIG. 14 is a partial side elevational view of top panel of the base with the low friction ring inserted into the upper hole.

FIG. 13 is a top plan view of the optional replaceable low friction ring 90 inserted around the perimeter edge 25 of the upper hole 24. The ring 90 includes a thin, round inward edge 92.

Figure 9:
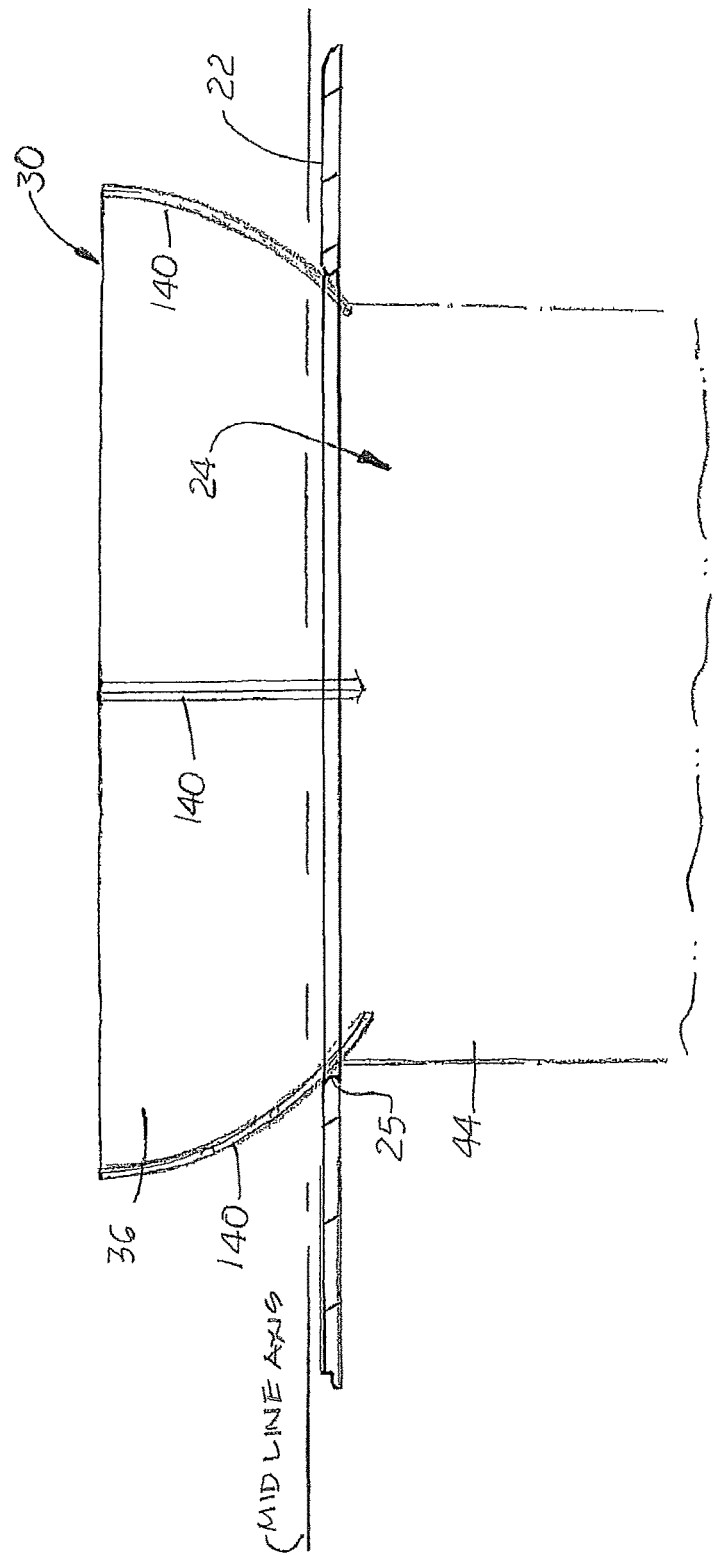
FIG. 9 is a partial sectional view of the base showing the thin, round perimeter edge surrounding the upper hole and showing the upper member of a container vessel with lower friction protruding ridges formed on the outer surface of the upper member.
Figure 15:
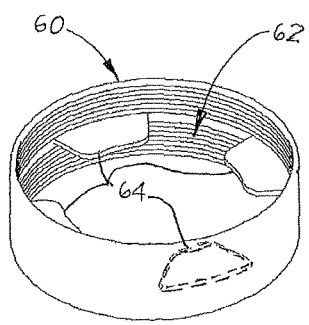
FIG. 15 is a perspective view of the insert gripping member.
Figure 16:
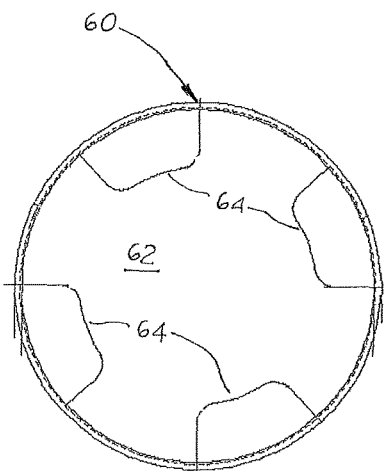
FIG. 16 is a top plan view of the insert gripping member.
Figure 17:
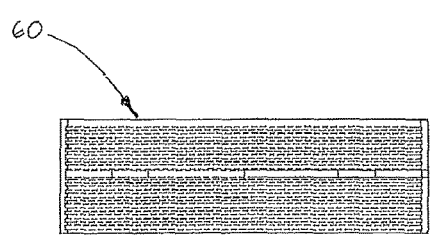
FIG. 17 is a side elevation view of the insert gripping member.

As shown in FIG. 1, located inside the upper section of the lower neck 44 is a ring inner gripping member 60. The gripping member 60 is configured to fit around the side walls of a beverage container 100 when the beverage container 100 is placed into the container vessel 30. As shown more clearly in FIGS. 15-17, the gripping member 60 includes a center opening 62 with a plurality of inward extending flexible arms 64 that extend into the center opening 62 and that apply light inward resistant opposing forces to the sides of the beverage container 100 to keep the beverage container 100 co-axially aligned inside the lower neck 44. As shown in FIG. 9, at least three lower friction protrusions 140 on the outer surface of the upper member 36 that reduce the contact surface areas between the upper member 36 and the perimeter edge 25 of the upper hole 24.

As shown in FIGS. 10, and 19-21, located on the closed end of the lower neck 44 are one or more disc-shaped spacers 80 that the user uses to adjust the height of the upper edge of the beverage container 100 when placed into the container vessel 30. The spacers include two upper recessed spaces 82, 84 and two downward extending necks 88, 91. During use, two or more spacers 80 may be stacked inside the lower neck 44 by inserting the necks 88, 91 on an upper spacer 80 into the spaces 82, 84 on a lower spacer 80. The spaces 82, 84 are also configured to receive the lower end of a beverage container 100 to hold the beverage container 100 inside the into the container vessel 30.

Figure 18:
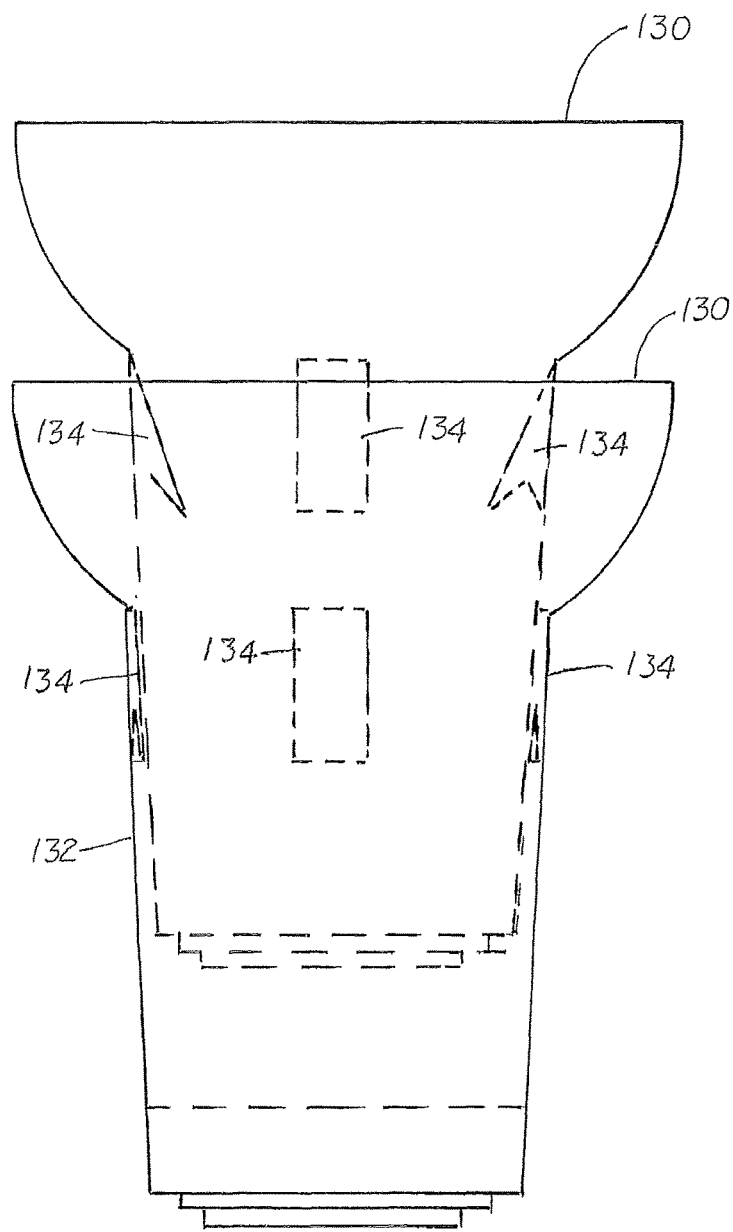
FIG. 18 is a second embodiment of two stacked container vessels with diagonally aligned side walls and with integrally formed flexible arms.
Figure 19:
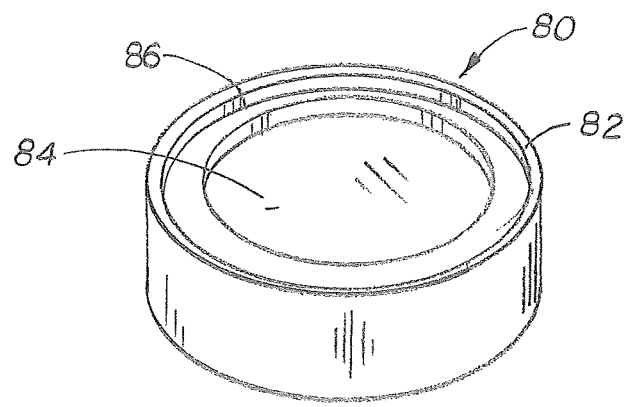
FIG. 19 is a perspective view of a spacer.
Figure 20:
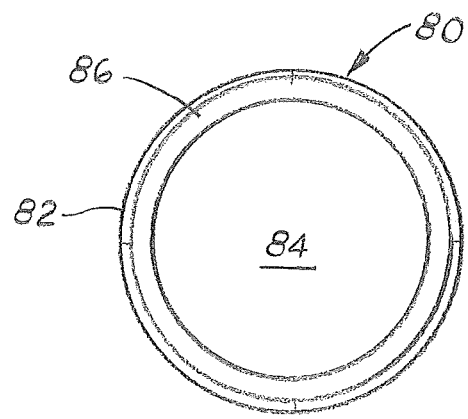
FIG. 20 is a top plan view of a spacer.
Figure 21:
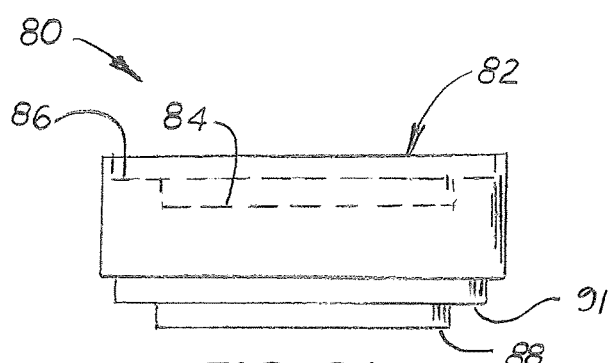
FIG. 21 is a side elevation view a spacer.
Figure 22:
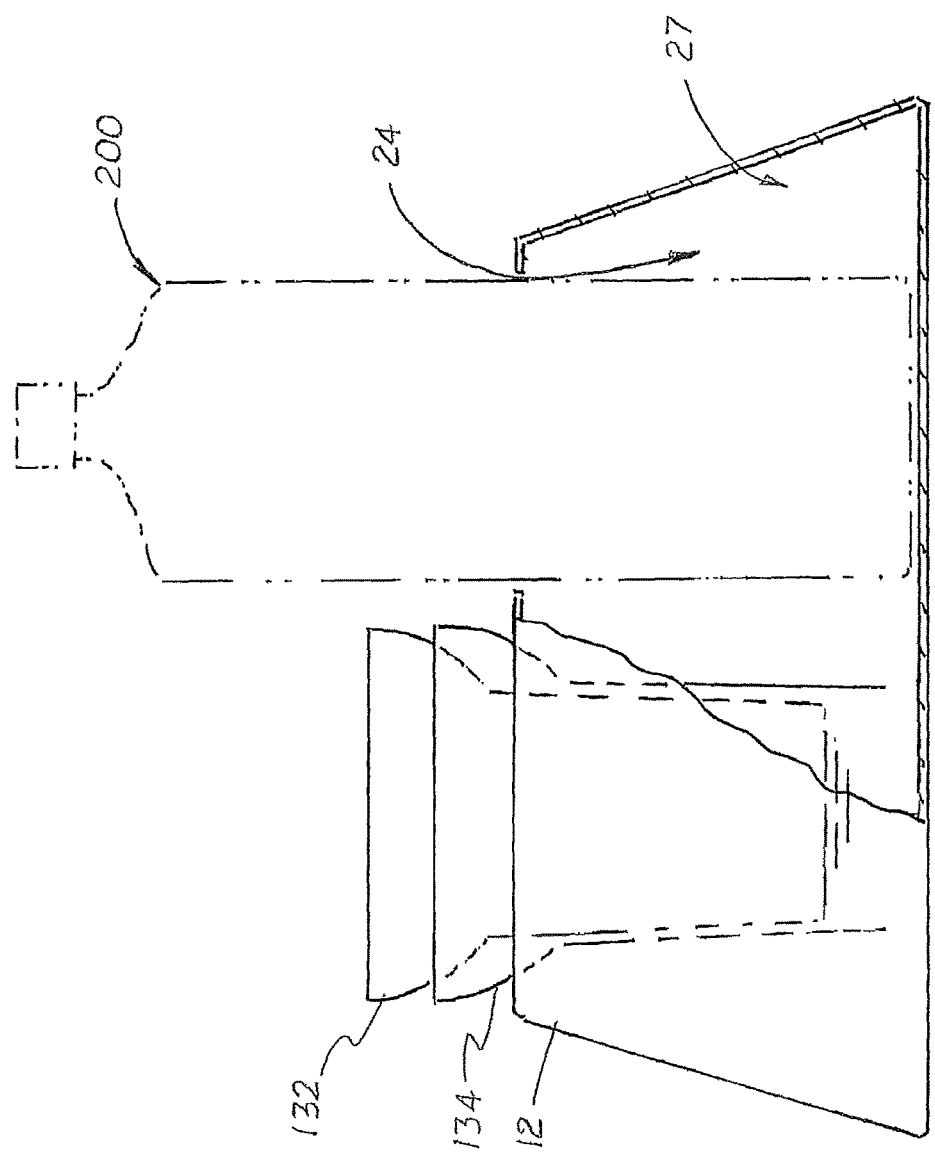
FIG. 22 is a perspective view of the motor vehicle beverage holder assembled by a manufacturer into a motor vehicle.

FIG. 18 is a second embodiment of two stacked container vessels 130 with lower necks that have diagonally aligned side walls 132. Formed inside the lower necks are integrally formed flexible arms 134.

Figure 23:
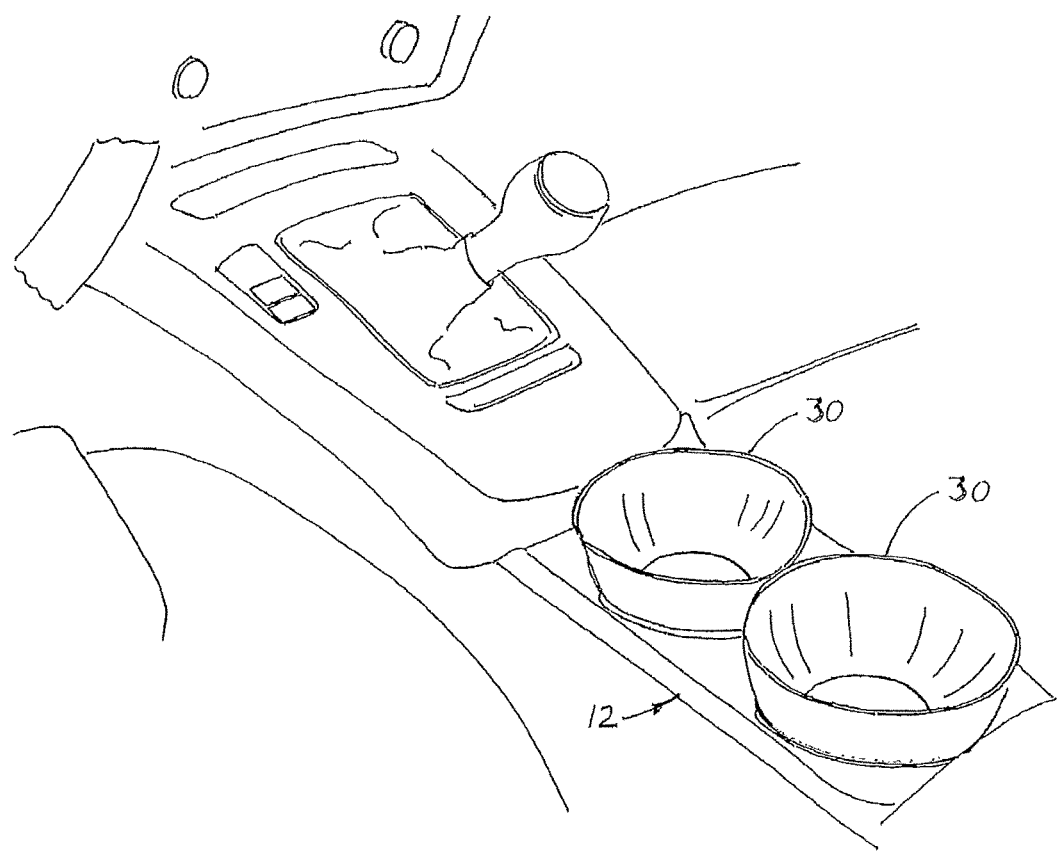
FIG. 23 is a partial sectional, side elevational view of the beverage holder holding a large 64 fl. oz plastic container with the two container vessels stacked together.

It should be understood that the holder 10 may be manufactured and sold either as an 'aftermarket product' that is installed by the motor vehicle owner or it may be manufactured and installed by the motor vehicle manufacturer and incorporated into the center console as shown in FIG. 23.

FIG. 24 is a partial sectional, side elevational view of the beverage holder holding a large 64 fl. oz plastic container 200 with the two container vessels 132, 132' stacked together. In the embodiments shown in the Figs, the base 12 has thin (⅛ inch) panels 14-16 and 22 made of plastic. The base 12 measures approximately 13 to 15 inches in length and 5 to 8 inches in width and 7 to 9 inches in height. Each upper hole 24 measures approximately 4.5 inches in diameter. When two holes 24 are used, the center of the upper holes 24 are approximately 5 inches apart. The top panel 22 of the base 12 is approximately ⅛$^{th}$ thin and the perimeter edge 25 is round.

The overall length of each container vessel 30 is 6.5 in length. The upper edge and the diameter of the upper member 36 is approximately 5 inches. The height of the upper member 36 is approximately 2 inches. The outside diameter of the lower neck 44 is 3.375 inches. The inside diameter of the inner bore is approximately 3.25 inches. The length of the lower neck 44 is approximately 4.5 inches.

INDUSTRIAL APPLICABILITY

This invention has application in the motor vehicle industry. More specifically, to the devices used to hold beverages inside a motor vehicle.

I claim:

1. A beverage holder for holding a beverage container in a vehicle, comprising:
   a. a beverage container vessel that includes a downward extending, half-spherical, hollow upper member and a lower neck with a lower end and a center bore that extends downward from said upper member, said lower neck configured to receive said beverage container so that when said beverage container is inserted into said lower neck, an upper portion of said beverage container extends upward and surrounded by said upper member, said upper member configured so that a continuous gap is formed between said upper member and said beverage container when said beverage container is inserted into said container vessel;
   b. at least one removable spacer disc disposed inside said center bore and against said end of said lower neck; and,
   c. a base with top planer surface with at least one upper hole formed therein, located below said upper hole is a cavity configured to receive said lower neck on said beverage container vessel, said upper hole has a diameter and a perimeter edge adapted to press against said upper member and enable said beverage container vessel to swivel from said to side and rotate 360 degrees on said base.

2. The beverage holder, as recited in claim 1, wherein said lower neck on said beverage container vessel is cylindrical with vertical side walls.

3. The beverage holder, as recited in claim 1, wherein said lower neck on said beverage container vessel is conical with downward converging side walls.

4. The beverage holder, as recited in claim 1, further including inward extending flexible arms formed on said center bore on said beverage container vessel, said flexible arms configured to apply a light inward resistant force to said beverage container when placed into said bore to reduce movement of said beverage container inside the beverage container vessel.

5. The beverage holder, as recited in claim 1, further including a ring with a plurality of ball bearings disposed thereon and attached to said perimeter edge of said upper hole.

6. The beverage holder, as recited in claim 5, wherein said beverage container vessel is cylindrical with vertical side walls.

7. The beverage holder, as recited in claim 5, wherein said beverage container vessel is conical with downward converging side walls.

8. The beverage holder, as recited in claim 7, further including inward extending flexible arms formed on said center bore on said beverage container vessel, said flexible arms configured to apply a light inward resistant force to said beverage container when placed into said bore to reduce movement of said beverage container inside the beverage container vessel.

9. The beverage holder, as recited in claim 1, further included a ring with a thin, round inward edge disposed inside said upper hole.

10. A beverage holder for holding a beverage container between two seats of a vehicle, comprising:
   a. a base located between said seats in said vehicle, said base includes a top surface with an upper hole formed thereon, said upper hole includes a perimeter edge and a cavity formed inside said base; and;
   b. a beverage container vessel configured to fit in between said seats, said beverage container vessel includes a downward extending, half-spherical, hollow upper member with an upper edge and a lower neck with a center bore configured to receive said beverage container, said upper edge is positioned above said top surface of said base and said neck extends downward from said upper member, said upper member on said container vessel is larger in diameter than said upper hole and made of low friction material configured to allow said beverage container vessel to swivel and rotate around said perimeter edge on said upper hole on said base.

11. The holder as recited in claim 10, further including at least one removable spacer disc disposed inside said center bore and against said end of said lower neck.

12. The holder, as recited in claim 10, wherein said beverage container vessel is cylindrical with vertical side walls.

13. The holder, as recited in claim 10, wherein said beverage container is conical with downward converging side walls.

14. The beverage holder, as recited in claim 10, further including said side walls on said beverage container vessel includes inward extending flexible arms.

15. The beverage holder, as recited in claim 10, further including a ring with a plurality of ball bearings disposed thereon attached to said perimeter edge of said upper hole.

16. The beverage holder, as recited in claim 10, further included a ring with a thin, round inward edge disposed inside said upper hole.

17. A holder for a beverage container filled with a liquid in a moving vehicle that reduces spills, the holder comprising:
   a. a base located inside a moving vehicle that includes a top surface with an upper hole located over an enclosed cavity; and;
   b. a rigid beverage container vessel configured to hold a beverage container over said upper hole on said base, said beverage container includes a downward extending, half-spherical, hollow upper member with a circular upper edge and a lower neck with diameter smaller than said upper member and a center bore configured to receive said beverage container, said lower neck being longer than said upper member and configured to be freely suspended inside said cavity, said cavity, said upper member and said lower neck in combination are configured to support said beverage container vessel over said upper hole on said base and allow said beverage container vessel to swivel from side to side over said base caused by centrifugal and centripetal forces exerted on said beverage container vessel when said vehicle is moving.

* * * * *